Patented May 29, 1923.

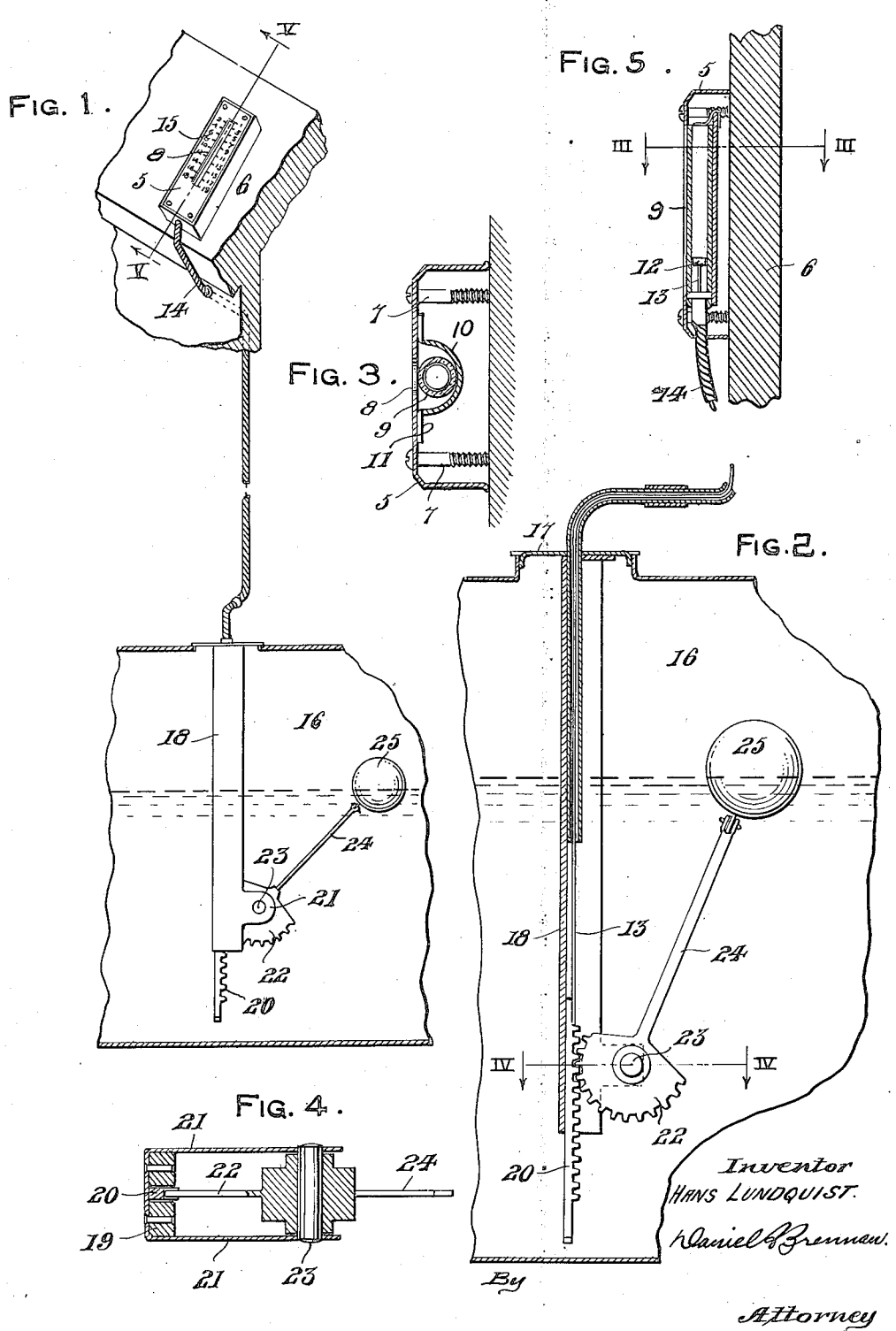

1,456,701

UNITED STATES PATENT OFFICE.

HANS LUNDQUIST, OF CHICAGO, ILLINOIS, ASSIGNOR TO UNITED STATES SPECIALTY CORPORATION, OF CHICAGO, ILLINOIS, A CORPORATION OF ILLINOIS.

LIQUID-LEVEL INDICATOR.

Application filed June 13, 1921. Serial No. 477,167.

*To all whom it may concern:*

Be it known that I, HANS LUNDQUIST, a citizen of the United States, residing at Chicago, county of Cook, and State of Illinois, have invented a new and useful Improvement in Liquid-Level Indicators, of which the following is a specification.

This invention relates to certain new and useful improvements in liquid level gages and has particular reference to float-operated liquid level indicators.

The primary object of the invention is to generally simplify and improve devices of the present kind so that the same may meet with all of the requirements for a successful commercial use.

A further object of the invention is to provide a liquid level gage or indicator particularly adaptable for use upon automobiles for indicating at a point in front of the driver's seat the amount of fuel contained in the gasoline tank situated at a distant point, and wherein the indicator member is provided with a simplified and improved operating mechanism including a float disposed within the fuel tank.

With these general objects in view and others that will appear as the nature of the invention is better understood, the same consists in the novel construction, combination and arrangement of parts hereinafter more fully described, illustrated in the accompanying drawings, and pointed out in the appended claims.

In the drawings forming a part of this application, and in which like designating characters refer to corresponding parts throughout the several views, Figure 1 is a fragmentary view partly in perspective, partly in elevation, and partly in section of a liquid level gage constructed in accordance with the present invention, Figure 2 is an enlarged fragmentary view of the device shown in Figure 1, partly in vertical section and partly in elevation, Figure 3 is a horizontal sectional view of the indicator taken upon line III—III of Figure 5.

Figure 4 is an enlarged horizontal sectional view taken upon line IV—IV of Figure 2.

Figure 5 is a vertical sectional view of the indicator taken on line V—V of Figure 1, looking in the direction indicated by the arrows.

Referring more in detail to the several views, the invention embodies an indicator including a metallic housing 5 adapted to be fastened against the dash or instrument-board of an automobile as at 6 by means of screws 7 or the like and having a longitudinal slot 8 in the front wall thereof through which a glass tube 9 may be seen, said tube being held against the inner surface of the front wall of the casing 5 by means including a suitable curved clamping strip or plate 10 having flanged edges as at 11 attached to the casing in any desired manner. The glass tube 9 has a liquid level indicating member or head 12 slidable longitudinally therein and this head is carried by the upper end of a flexible wire 13 which extends through a flexible tubing 14 having one end coupled to the lower end of the tube 9 and extending through the bottom wall of the casing 5. Suitable graduations are provided as at 15 on the front wall of the casing 5 for indicating the amount of fuel within a tank 6 according to the position of the indicator member 12 within the tube 9 in a manner that will presently become apparent.

The liquid tank 16, when comprising the fuel tank of an automobile, is usually situated at some point remote from the dash or instrument-board 6 and the tubing 14 and wire 13 are extended to this tank and may be flexed as desired without interfering with the operation as will be apparent. The tank 16 is provided with a suitable opening having a cap or closure 17 disposed therein, and a channel-shaped sheet metal guide 18 has its upper end rigidly fastened to the closure 17 so that said guide depends in a substantially vertical position into the tank 16 to a point near the bottom of the latter, the adacent end portion of the flexible tube 14 being passed through the closure 17, and positioned upon the central portion of the guide 18 between the flanges of the latter. A pair of guide strips 19 are secured to the central or base portion of the guide 18 in contact with the flanges of the latter and with their adjacent sides in spaced relation, and a rack bar 20 is slidably guided between the strips 19 for vertical movement longitudinally of the guide 18 at the lower portion of the latter, said rack bar having its upper end attached to the adjacent end portion of the wire 13. A pair of ears 21 are formed integral with the flanges of the guide 18 near its lower end and a segment gear 22 is pivoted upon a horizontal axis between these ears as at 23, the segment gear 22 being in mesh with the rack bar 20, and having a radially extending arm 24 with a float 25 fixed upon the outer end thereof.

In operation, when the tank 16 is being filled with liquid, the float 25 will rise and upwardly swing the arm 24 so as to rotate the gear 22 and cause downward movement of the rack bar 20. This exerts a pull upon the wire 13 for lowering the indicator member 12 and by noting the graduation opposite which the indicator member is positioned, the amount of liquid in the tank will be indicated. It is noted that the graduations progress from top to bottom and as the liquid is used or drawn from the tank 16, the float 25 will lower so as to cause the wire 13 to be pushed upwardly with the rack bar 20 thus causing upward movement of the indicator member 12.

The present invention thus embodies a simple and durable construction of liquid level gage which may be cheaply and easily manufactured and it will be efficient in operation.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

1. A liquid level gage comprising in combination a vertically movable indicator member, a flexible wire attached directly thereto, a float and float-actuated means operated by the upward movement of the float and connected directly to the other end of said wire for exerting a pull upon said wire and lowering said indicator member.

2. A liquid level gage comprising in combination a vertically movable indicator member having a flexible wire attached thereto, a float and float-actuated means operated by the upward movement of the float for exerting a pull upon said wire and lowering said indicator member, said last-named means including a rack bar connected directly to said wire and guided for longitudinal sliding movement in a vertical direction, a gear pivoted upon a horizontal axis and meshing with said rack bar, an arm extending radially from said gear and having the float attached to its outer end.

3. A liquid level indicator actuating mechanism including a channel-shaped guide having means for supporting the same in a substantially vertical position within a tank and having spaced longitudinal guide strips fastened thereto between its flanges, a rack bar longitudinally slidably guided between said strips, a float and float-operated means for longitudinally sliding said rack bar.

4. A liquid level indicator actuating mechanism including a channel-shaped guide having means for supporting the same in a substantially vertical position within a tank and having spaced longitudinal guide strips fastened thereto between its flanges, a rack bar longitudinally slidably guided between said strips, said guide being provided with laterally extending spaced ears at its lower end portion rigid with the flanges of the same, a gear pivotally supported between said ears upon a horizontal axis and meshing with said rack bar, and a radially extending arm rigid with said gear having a float attached to the outer end thereof.

5. A liquid level indicator actuating mechanism including a channel-shaped guide having means for supporting the same in a substantially vertical position within a tank and having spaced longitudinal guide strips fastened thereto between its flanges, a rack bar longitudinally slidably guided between said strips, a float, float-operated means for longitudinally sliding said rack bar, said means for supporting the guide including a tank closure having an opening therein communicating with the space between the flanges of the guide at the upper end of the latter, a flexible tubing having an end portion extended through said opening and into said guide, a flexible wire within the tubing having one end attached to the upper end of said rack bar, and a slidable indicator member attached to the other end of said wire.

6. A liquid level indicator actuating mechanism including a channel-shaped guide having means for supporting the same in a substantially vertical position within a tank, a rack bar longitudinally slidable in said guide, a gear pivotally supported by the guide adjacent the lower end of the latter upon a horizontal axis and meshing with said rack bar, and a radially-extending arm rigid with said gear having a float attached to the outer end thereof.

7. In a device of the character described, in combination, a tank adapted to contain liquid, an indicating device comprising a head movable in a vertical plane, an inverted scale adjacent said head, a pivoted float in said tank and a vertically slidable element operable thereby, and a flexible motion transmitting element directly connecting said indicating head and vertically slidable element.

In testimony whereof, I affix my signature in the presence of two witnesses at 36 W. Randolph St., Chicago, Illinois.

HANS LUNDQUIST.

Witnesses:
DANIEL A. BRENNAN,
H. S. OLSEN.